United States Patent [19]
Fletcher, Jr.

[11] 4,035,660
[45] July 12, 1977

[54] CONTROL DEVICE

[75] Inventor: Stacy G. Fletcher, Jr., New Holland, Pa.

[73] Assignee: Aggregates Equipment, Inc., Leola, Pa.

[21] Appl. No.: 589,944

[22] Filed: June 24, 1975

[51] Int. Cl.² .......................................... H01H 7/00
[52] U.S. Cl. ................................ 307/141; 361/23; 340/267 R
[58] Field of Search ................... 307/141 R, 141.4; 317/135, 141 R, 154, 155, 13 A; 318/487, 484; 340/267 R

[56] References Cited
U.S. PATENT DOCUMENTS 2,241,589  5/1941  Feldhausen ............... 340/267 R
2,727,227  12/1955  Mead ....................... 340/267 R Primary Examiner—David Smith, Jr.
Attorney, Agent, or Firm—John C. Thompson

[57] ABSTRACT

A control device interconnectible with the starter circuit of electrical machinery or the like, said control device in one form including a momentary contact push button "start" switch. When the operation of the control device is initiated current will initially be permitted to flow through an alarm circuit and current flow through said starter circuit will initially be prohibited. At the completion of a preset time period the control device will subsequently prohibit current flow through said alarm circuit and permit current flow through said starter circuit. The alarm device, which may be audible or visual, may be either incorporated within the control device or may be interconnected thereto by suitable terminals on the control device. Similarly, the normally open momentary contact "start" button may be integrated within the control device or may be interconnected thereto by suitable terminals.

12 Claims, 2 Drawing Figures

CONTROL DEVICE

FIELD OF THE INVENTION

The present invention relates generally to a control device for machinery which is started through an electrical circuit, and more particularly to a control device which can be interposed into a starter circuit of electrical machinery or the like, the control device causing the operation of an alarm device for a preset period of time before the electrical machinery can be started.

BACKGROUND OF THE INVENTION

In the past many injuries have occurred in industry when workmen have been in hazardous positions relative to machinery at the time of start-up of the machinery, the workmen subsequently being injured due to the initial start-up of the machinery. For example, a workman may be standing on a conveyor when the conveyor is started, the initial movement of the conveyor causing the workman to be thrown off balance and subsequently injured. In order to prevent such accidents from happening the operation of the machinery, when possible, will normally observe the machinery before start-up to make sure that no workmen are in hazardous positions. While this procedure will minimize injuries, if followed, in some occasions the operator of the machinery will fail to check to see that no one is endangered when the machinery is started. On other occasions, due to the location of the starting switch, it is not possible to see all locations of the machinery to see if it is safe to start the machinery. Therefore, it has been previously proposed to incorporate alarm circuits within the starting circuits of such machinery. The alarm circuits may include either an audible alarm, such as an electrically driven horn or buzzer, or may include lights, or both. Such alarm systems are now in many cases required by the Occupational Safety and Health Act. Heretofore, when adding alarm circuits to existing machinery it has been necessary to substantially rewire the existing machinery putting in suitable time delay circuits and alarm devices, the installation of such alarm devices not only causing the person responsible for making such changes the necessity of designing the various circuits and the bother of purchasing the various components, but also causing substantial down time on the machinery while such warning circuits and delayed starting circuits are added.

OBJECTS AND SUMMARY OF THE INVENTION

It is an object of the present invention to provide a control device which can be interconnected with an existing starter circuit of electrical machinery, the initiation of the operation of the control device causing current to initially flow through an alarm circuit while prohibiting current flow through the starter circuit of industrial machinery, and subsequently, after a predetermined time period, prohibiting the current flow through the alarm circuit, and permitting current flow through the starter circuit of the industrial machinery.

It is a further object of the present invention to provide a control device interconnectible with a primary electrical supply, the control device including push button "start" and "stop" switches, means operable to initially permit current flow through an alarm circuit and to prohibit current flow through a starter circuit of industrial machinery or the like, and means operable to subsequentially prohibit current flow through said starter circuit.

The foregoing objects and other objects and advantages are accomplished by providing a control device including a first or control relay having first and second normally open contacts and an actuator, a time delay relay having an actuator, a normally open timed delayed contact for closing and a normally closed timed delay contact for opening, normally open and normally closed "start" and "stop" push button switches, (which may be remote), one of the normally open contacts of the first relay being in parallel with the normally open start switch and in series with the actuator of the control relay, the actuator holding both the first and second contacts of the first relay closed after the initial closing of the start switch by virtue of electrical flow through said first contact and the actuator, the normally closed timed delayed contact for opening being disposed in series with the first normally open contact of the first relay and in parallel with the actuator of the first relay, said alarm circuit extending between the normally closed timed delayed contact for opening and one line of a primary electrical supply, the actuator for the time delay relay being in series with the second normally open contact of the control relay, and the normally open timed delayed contact for closing being isolated from the primary electrical supply. The control device further includes a plurality of terminals, one pair of terminals being disposed on opposite sides of the isolated normally open timed delayed contact for closing and being interconnectible with the starter circuit for electrical machinery in such a manner that the normally open timed delayed contact for closing is interposed in the starter circuit of the machinery. The control device may include its own internal alarm, such as a buzzer, but in addition terminals are provided for bridging the alarm circuit of the control device with external alarms such as electrically driven horns, flashing lights, or various equivalents. Furthermore, the external terminals on the control device permit the installation of external or remote controls such as starting and stopping devices. Such external controls may also include a remote pilot light, although the control device is provided with its own pilot light.

The foregoing objects and other objects and advantages of this invention will be apparent to those skilled in the art after a consideration of the following detailed description taken in conjunction with the accompanying drawings.

DETAILED DESCRIPTION OF PREFERRED EMBODIMENTS

Figure 1:
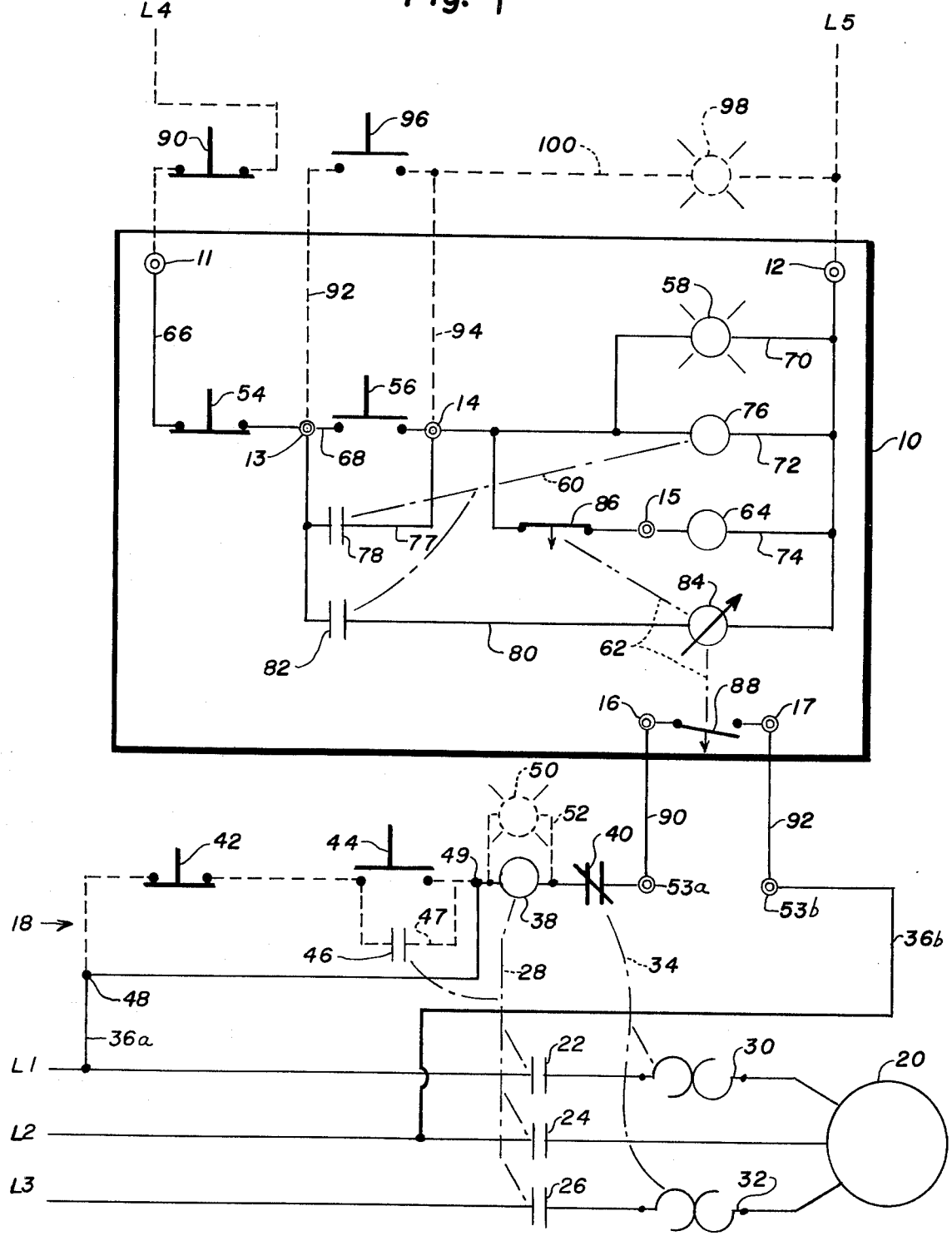
FIG. 1 is a schematic electrical diagram of one form of the control device, the control device being shown interconnected with the starting circuit of a three phase electrical motor, remote controls for the control device being shown in broken lines.

In the following description common elements in the various Figures will be referred to by the same reference numerals.

The control device includes an enclosure indicated at 10 in which are mounted various electrical components. Mounted on the enclosure are various terminals 11, 12, 13, 14, 15, 16, and 17, the function of the various terminals being set forth below. Before describing the control device, one form of a conventional starter circuit with which it may be associated will hereinafter be described.

As can be seen from FIG. 1, the starter circuit, indicated generally at 18 is shown associated with a three phase motor. The starter circuit can of course be used with devices other than a three phase motor, 20. The three phase motor 20 is interconnected with power lines L1, L2 and L3, the power lines having interposed therein normally open contacts 22, 24, 26, respectively, of a starter relay indicated by the dot-dash line 28. Also interposed in lines L1 and L3 are thermal elements 30, 32, respectively, of an overload relay indicated by the dot-dash line 34. The starter circuit includes an electrical line 36a, 36b which bridges the incoming power lines L1 and L2, although a separate electrical supply may be used for the starter circuit. Mounted within the electrical line 36 are the actuator 38 of the starter relay 28, and the normally closed contact 40 of the overload relay 34. The starter circuit 18 would also customarilly have a normally closed push button "stop"contact or switch 42 and a momentary contact normally open push button "start"switch or contact 44 interposed in line 36a, the start switch being associated with a normally open contact 46 of the starter relay, the contact being interposed in a line 47 which is parallel to the start switch 44. However, as it is generally desirable to have the control device of this invention initiate and stop the operation of the motor 20, the stop and start switches 42 and 44 and the contact 46 will be shorted out (or eliminated) by a portion of the line 36a which extends between terminals 48 and 49. Therefore, the customary switches 42 and 44 and the contact 46 are shown in broken lines as they would not customarily be employed with the control device of this invention. The starter circuit may also be provided with a pilot light 50 which is shown in broken lines in FIG. 1, the pilot light being mounted within a line 52 which is parallel to the actuator 38.

When current flows through the actuator 38 in the circuit illustrated the normally open contacts 22, 24, 26 (and 46 if used) will be closed and the actuator 38 will hold the various contacts closed by virtue of the electrical flow through the actuator 38 of the starter relay 28, thereby permitting the motor 20 to start. The starter circuit so far described is, (with the exception of the shorting or elimination of the switches 42 and 44 and the contact 46), of a generally conventional design. In order to accommodate the control device of this invention the line 36 is broken, establishing the separate lines 36a, 36b, and the adjacent ends of the lines 36a, 36b are provided with terminals 53a, 53b to which the control device may be connected, thus permitting the easy insertion of the control device of this invention into the starter circuit.

Mounted on the enclosure 10 of the control device of this invention is a normally closed push button "stop"-switch or contact 54, a momentary contact normally open push button "start"switch or contact 56, and a pilot light 58. Mounted within the enclosure is a control relay indicated by the dot-dash line 60, and a time relay indicated by the dot-dash line 62. An alarm circuit extends between terminals 15 and 12 and may include a device 64 mounted within or on the enclosure, the alarm device 64 emitting an audible alarm. However, a remote alarm circuit may be employed which can easily be interconnected between terminals 15 and 12. When an external or remote alarm circuit is used it may include either an audible alarm or a visual alarm, or both.

It should be noted at this point that the stop switch 54 is interposed in an electrical line 66 which extends between terminals 12 and 13, and that the start switch 56 is interposed in line 68 which extends between terminals 13 and 14. Parallel electrical lines 70, 72 and 74 extend between the terminal 14 and the terminal 12 within the enclosure, the pilot light 58 being interposed in the electrical line 70, the actuator 76 (which may be a coil) of the control relay 60 being interposed in the electrical line 72, and the terminal 15 and the alarm device 64 being interposed in line 74 with the alarm device being between the terminals 15 and 12. An electrical line 77 is in parallel with the line 68, and a first normally open contact 78 of the control relay 60 is interposed therein. An additional electrical line 80 extends from line 77 from a point between the terminal 13 and the normally open contact 78 to the terminal 12. A second normally open contact 82 of the control relay 60 is disposed within this line. Between the normally open contact 82 and the terminal 12 is interposed the actuator 84 of the time delay relay 62.

The time delay relay 62 is preferably of the type wherein the actuator can be set for varying time periods. The time delay relay also includes a normally closed timed delayed contact for opening 86 which is interposed in line 74 between terminals 14 and 15. The time delay relay also includes a normally open timed delayed contact for closing 88 which extends between terminals 16 and 17 and is isolated from the other circuits of the control device.

The control device is inserted into the starter circuit 18 by interconnecting the terminals 16 and 17 with terminals 53a, 53b, respectively, by electrical lines 90, 92. After the control device has been inserted into the starter circuit, it is then only necessary to interconnect terminals 12 and 11 to a primary electrical supply represented by lines L4 and L5. The primary electrical supply may be any source of electrical current, and in the preferred embodiment is 120 volt 60 cycle current.

In order to operate the control device after it has been inserted into the starter circuit interconnecting to the primary electrical supply it is only necessary to switch the control device from an off mode to an on mode by momentarilly closing the switch or contact means 56. This will cause current to flow through lines 66, 68 and the parallel lines 70, 72 and 74. Current flow through line 70 will cause the pilot light 58 to be illuminated. Current flow through the actuator 76 in line 72 will in turn cause the normally open contacts 78 and 82 to close, and current flow through the contact 78 and the actuator 76 will maintain the contacts 78 and 82 in their closed position even after the momentary contact 56 has been released. As the contact 82 is closed, current will also flow through line 80 and the actuator 84 of the time delay relay. Once the control device has been switched to its on mode the normally closed timed delayed contact for opening and the normally open timed delayed contact for closing 88 will initially permit current flow through the alarm circuit and prohibit current flow through the starter circuit of the industrial machinery, respectively. In this connection, it should be appreciated that when current initially flows through the actuator 84 of the time delay relay 62 that the contacts 86 and 88 will be in their initial positions. When the normally closed timed delayed contact for opening 86 is in its initial position current will flow through the contact 86 past the terminal 15 and through the internal alarm 64 in line 74. If an external alarm circuit is provided, such an alarm not being shown in the drawings, the current will flow through contact 86, to terminal 15 and through the external alarm circuit which would bridge terminals 15 and 12. The actuator 84 is initially set for a predetermined time period, and at the completion of the preset time period the actuator 84 will cause the contacts 86 and 88 to switch to open and closed positions, respectively, to subsequently prohibit current flow through the alarm circuit and to permit current flow through the starter circuit.

If the starter circuit is of the type shown in full lines in FIG. 1 current will now flow through the actuator 38 of the starter relay 28, as well as through the normally closed contact of the overload relay 34 in addition to passing through lines 36a, 90, the now closed time delayed contact 88, line 92 and 36b. As current is flowing through the actuator 38, the contacts 22, 24 and 26 will be closed permitting current flow through the industrial machinery or the like represented by the three phase motor 20.

To subsequently discontinue the operation of the motor it is only necessary to engage and move the contact 54 to its open position. This will cause the time delay relay 62 to reset, and when the start button is push again the alarm will sound prior to the operation of the machinery. If the starter circuit 18 employs the stop and start switches 42, 44 shown in broken lines, after the actuator 84 of the time delay relay 62 has timed out and the alarm has been discontinued the machinery, such as the three phase motor 20, may be started by means of the start switch 44 and its operation subsequently discontinued by the operation of the stop switch 42. As the initial start up and subsequent start ups of the machinery would not of necessity follow the actuation of the alarm it should be appreciated that it is usually desirable to short circuit the start and stop switches of the conventional starter circuit.

In some instances it may be desirable to control the operation of the control device of this invention from a remote location. To this end a remote stop switch 90 may be disposed in the incoming power line L4. Similarly, line 68 may be bridged by lines 92 and 94 which are interconnected at one end to terminals 13, 14, respectively, the lines 92, 94 being interconnected at their other end to a remote start switch 96. If it is desirable to have a remote pilot light 98 this may be disposed in a line 100 which extends from line 98 to the primary power line L5. It should be appreciated that the operation of the control device with the remote controls 90, 96 will be the same as that previously described.

Figure 2:
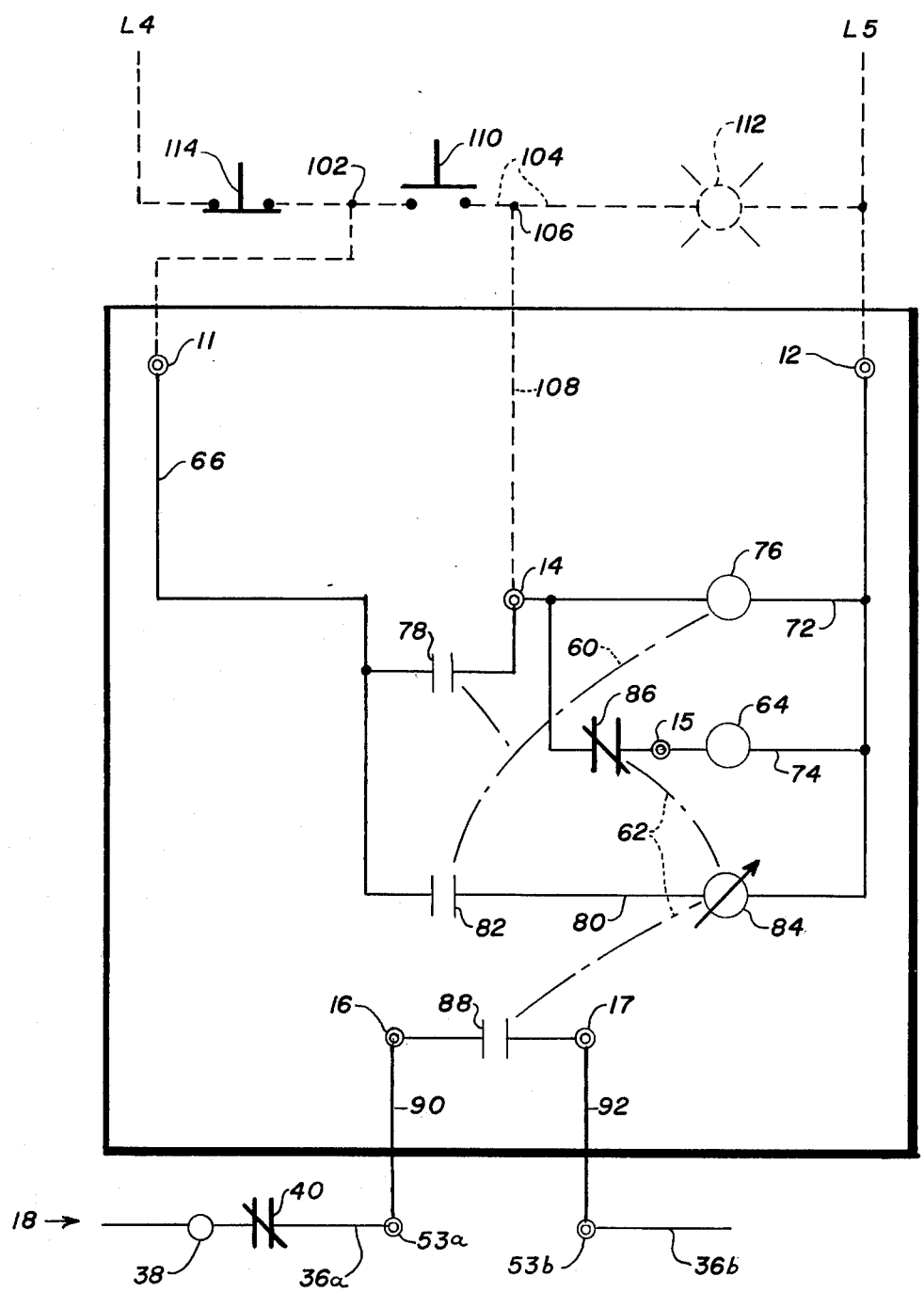
FIG. 2 shows in full lines a slightly different version of the control device of this invention, connections to remote normally open start and normally closed stop push buttons and a remote pilot light being shown in broken lines.

In FIG. 2 a slightly different version of the control device is illustrated. In this version the control device is essentially the same, however it is not provided with the start and stop switch 56, 54 of the version shown in FIG. 1, nor is it provided with its own pilot light 58. Line 68 and 70 are also eliminated as well as terminal 13. This device is suitable for only remote operation and to this end the incoming power line L5 is provided with a terminal 102, and an additional line 104 is provided, the line 104 extending between the terminal 102 and the power line L5. The line 104 is provided with a terminal 106 and a line 108 extends from the terminal 106 to the terminal 14. A remote start switch 110 is disposed in line 104 between the terminals 102 and 106, and a pilot light 112 is disposed in the line 104 between the terminal 106 and line L5. The line L4 is also provided with a remote stop switch 114.

As shown in FIG. 2, the circuit, including the starter circuit 18, would not include any other start or stop switches with the exception of the remote switches 110, 112. The operation of the control device would be initiated by momentary closing of the remote start switch 110 which would cause the control relay 60 to close the normally open contacts 78 and 82 and also would cause the initiation of the operation of the time delay relay 62 which would initially permit current flow through the alarm circuit which extends between terminals 15 and 12 and also initially prohibit current flow through the starter circuit due to the imposition of the normally open timed delay contact for closing in the starter circuit 18. Subsequently at the completion of the preset time period for which the actuator of the time delay relay is set, the normally closed timed delayed contact for opening 86 would open prohibiting the further flow of current through the alarm circuit, and the normally open timed delayed contact for closing would close permitting current flow through the starter circuit 18. This would in turn initiate operation of the electrical machinery to which the starter circuit 18 is interconnected.

While the preferred design in which the principles of the present invention have been incorporated are shown and described above, it is to be understood that the invention is not to be limited to the particular details shown and described above, but that, in fact, widely differing means may be employed in the practice of the broader aspects of this invention.

What is claimed is:

1. A control device interconnectable with the starter circuit of industrial machinery or the like and operable to initiate actuation of an alarm prior to permitting current flow through said starter circuit; said device comprising:

a housing provided with a plurality of terminals two of which are interconnectable with the starter circuit of industrial machinery or the like;

means to switch said control device from an off mode to an on mode;

means mounted within the housing operable to initially permit current flow through an alarm circuit when said control device is initially switched to its on mode;

normally open contact means mounted with the housing and extending between said two terminal, said normally open contact means prohibiting current flow through said starter circuit when said control device is initially switched to its on mode; and means mounted within the housing operable to subsequently prohibit current flow through said alarm circuit and to permit current flow through said starter circuit at the completion of a preset time period.

2. The control device set forth in claim 1 wherein said means to initially permit current flow through an alarm circuit and said normally open contact means are a normally closed timed delayed contact for opening and a normally open timed delayed contact for closing, respectively, of a time delay relay.

3. The control device set forth in claim 2 wherein said means to subsequently prohibit current flow through said alarm circuit and to permit current flow through said starter circuit is the actuator of said time delay relay which causes said normally closed and normally open contacts to open and close, respectively, upon completion of the time period of which the time delay relay has been preset.

4. The control device set forth in claim 3 wherein said actuator of the time delay relay can be set for varying time periods.

5. The control device set forth in claim 1 wherein said means to switch said control device from an off mode to an on mode includes a control relay mounted within said housing and having a plurality of normally open contact means and an actuator.

6. The control device set forth in claim 5 wherein said means to switch said control device from an off mode to an on mode further includes a momentary contact normally open switch disposed in series with the actuator of the control relay and in parallel with at least one of said plurality of normally open contact means, said momentary contact switch when in a closed mode permitting electrical flow through said actuator, and said actuator holding said plurality of normally open contacts closed after the initial closing of said switch by virtue of the electrical flow through one of said contacts and the actuator of the control relay.

7. The control device set forth in claim 6 further characterized by the provision of a normally closed push button contact switch disposed in series with the normally open momentary contact switch and operable when pushed to prohibit current flow through the actuator and thereby cause the normally open contacts to open.

8. The control device set forth in claim 5 wherein said plurality of terminals further includes third and fourth terminals to either side of at least one of said plurality of normally open contact means of said means to switch said control device from an off mode to an on mode, said terminals being interconnectable with a remote momentary contact switch in such a manner that said remote momentary contact switch can initiate the operation of the control device.

9. A control device powered from a primary electrical supply and insertable within the starter circuit of industrial machinery or the like, said control device being operable to permit current flow through an alarm circuit for a preset time period while current flow through the starter circuit is prohibited and at the completion of the preset time period to prohibit current flow through the alarm circuit and to permit current flow through the starter circuit; said control device comprising:

a control relay having first and second normally open contacts and an actuator;

a start switch disposed in series with the actuator of the control relay across the primary electrical supply and in parallel with said first contact, said start switch when in a closed mode permitting electrical flow through said actuator, and said actuator holding said first and second contacts closed after the initial closing of said start switch by virtue of electrical flow through said first contact and the actuator of the control relay;

a time delay relay having an actuator, a normally open timed delayed contact for closing and a normally closed timed delayed contact for opening, the actuator of the time delay relay being disposed in series with the second contact of the control relay across said primary electrical supply, said time delay relay operating upon the closing of said second contact of said control relay to open said normally closed timed delayed contact for opening and to close said normally open timed delayed contact for closing upon completion of the time period for which the time delay relay has been preset, said normally open timed delayed contact for closing being inserted in a starter circuit; and an alarm circuit extending between said normally closed timed delayed contact for closing and said primary electrical supply and operable to cause actuation of an alarm after initial closing of said start switch and until the opening of the normally closed timed delayed contact for opening.

10. The control device set forth in claim 9 wherein said control device further includes a pilot light disposed in series with said start switch across said primary electrical supply.

11. The control device set forth in claim 9 further characterized by the provision of a stop switch disposed in series with said start switch and the actuator of the control relay across said primary electrical supply, said stop switch being operable to interrupt current flow through the actuator of the control relay to cause said first and second contacts, when closed, to open and also to reset the time delay relay.

12. The control device set forth in claim 9 further characterized by the provision of terminals to either side of said start switch whereby said control device may be inter-connected with remote controls.

* * * * *